(12) United States Patent
Kodalapura et al.

(10) Patent No.: US 11,777,705 B2
(45) Date of Patent: *Oct. 3, 2023

(54) TECHNIQUES FOR PREVENTING MEMORY TIMING ATTACKS

(71) Applicant: INTEL CORPORATION, Santa Clara, CA (US)

(72) Inventors: Nagaraju N. Kodalapura, Hillsboro, OR (US); Arun Kanuparthi, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/384,268

(22) Filed: Jul. 23, 2021

(65) Prior Publication Data

US 2021/0351911 A1 Nov. 11, 2021

Related U.S. Application Data

(63) Continuation of application No. 16/173,041, filed on Oct. 29, 2018, now Pat. No. 11,121,853, which is a continuation of application No. 15/715,518, filed on Sep. 26, 2017, now Pat. No. 10,116,436.

(51) Int. Cl.
| | |
|---|---|
| *G06F 21/79* | (2013.01) |
| *G06F 21/55* | (2013.01) |
| *G06F 21/50* | (2013.01) |
| *H04L 9/00* | (2022.01) |
| *G06F 21/56* | (2013.01) |
| *G06F 21/52* | (2013.01) |

(52) U.S. Cl.
CPC .............. *H04L 9/005* (2013.01); *G06F 21/52* (2013.01); *G06F 21/564* (2013.01); *G06F 21/79* (2013.01); *G06F 21/50* (2013.01); *G06F 21/552* (2013.01)

(58) Field of Classification Search
CPC ... H04L 63/1416; H04L 9/005; G06F 21/564; G06F 21/50; G06F 21/577; G06F 21/60; G06F 21/52; G06F 21/79; G06F 3/062; G06F 21/552

See application file for complete search history.

(56) References Cited

U.S. PATENT DOCUMENTS

| | | | |
|---|---|---|---|
| 10,116,436 B1 * | 10/2018 | Kodalapura | G06F 21/79 |
| 10,255,181 B2 * | 4/2019 | Turner | G06F 12/0877 |
| 10,318,474 B1 * | 6/2019 | Krasner | G06F 12/084 |

(Continued)

*Primary Examiner* — Hosuk Song
(74) *Attorney, Agent, or Firm* — KDW FIRM PLLC

(57) ABSTRACT

Techniques and apparatuses for detecting and preventing memory attacks are described. In one embodiment, for example, an apparatus may include at least one memory comprising a shared memory and a system memory, logic, at least a portion of the logic comprised in hardware coupled to the at least one shared memory, the logic to implement a memory monitor to determine a memory attack by an attacker application against a victim application using the shared memory, and prevent the memory attack, the memory monitor to determine that victim data is being reloaded into the shared memory from the system memory, store the victim data in a monitor memory, flush shared memory data stored in the shared memory, and write the victim data to the shared memory. Other embodiments are described and claimed.

22 Claims, 12 Drawing Sheets

(56) References Cited

U.S. PATENT DOCUMENTS

| | | | | |
|---|---|---|---|---|
| 10,430,100 B2* | 10/2019 | Barber | ............... | G06F 16/2322 |
| 10,445,211 B2* | 10/2019 | Mola | .................. | G06F 11/3419 |
| 10,860,709 B2* | 12/2020 | Lemay | ............... | G06F 9/45558 |
| 10,902,123 B2* | 1/2021 | Woodward | ............ | G06F 21/566 |
| 10,915,466 B2* | 2/2021 | Hagersten | ........... | G06F 12/1483 |
| 11,121,853 B2* | 9/2021 | Kodalapura | ............ | H04L 9/005 |

* cited by examiner

TECHNIQUES FOR PREVENTING MEMORY TIMING ATTACKS

CROSS REFERENCE TO RELATED APPLICATIONS

This application is a continuation of, claims the benefit of and priority to previously filed U.S. patent application Ser. No. 16/173,041 filed Oct. 29, 2018, entitled "TECHNIQUES FOR PREVENTING MEMORY TIMING ATTACKS", which is a continuation of, claims the benefit of and priority to previously filed U.S. patent application Ser. No. 15/715,518 filed Sep. 26, 2017, entitled "TECHNIQUES FOR PREVENTING MEMORY TIMING ATTACKS", which are hereby incorporated by reference in their entireties.

TECHNICAL FIELD

Embodiments described herein generally relate to computer security and processor architecture and, more specifically, to protecting computing systems from memory attacks.

BACKGROUND

Computer architecture platforms are susceptible to various types of attacks that attempt to gain unauthorized access to data and/or platform resources. Technological improvements in security functions and hardware of sophisticated systems have provided some level of resistance to direct attacks. As a result, attackers often pursue side-channel techniques to gain access to sophisticated systems. In general, a side-channel attack attempts to obtain metadata available in various system components to deduce what a specific process is computing. For example, such attacks have been used to find encryption keys and user passwords. Side-channel attacks may be based on inter-process leakage through the state of a system processor memory cache. For example, a side-channel attack may access metadata that can be used to learn the secret keys that are obtained from a physical implementation of a cryptosystem. The metadata may include timing information or power consumption. For example, a timing attack is a form of side-channel attack based on measuring how much time it takes to process different inputs, for example, due to performance optimizations to bypass unnecessary operations, branching, cache memory and operations (for example, multiplication and division) that run in a non-fixed time. Conventional side-channel attack countermeasures, such as cache coloring and dynamic cache size partitioning, have become less effective and incur unacceptably-high performance overheads.

DETAILED DESCRIPTION

Figure 1:
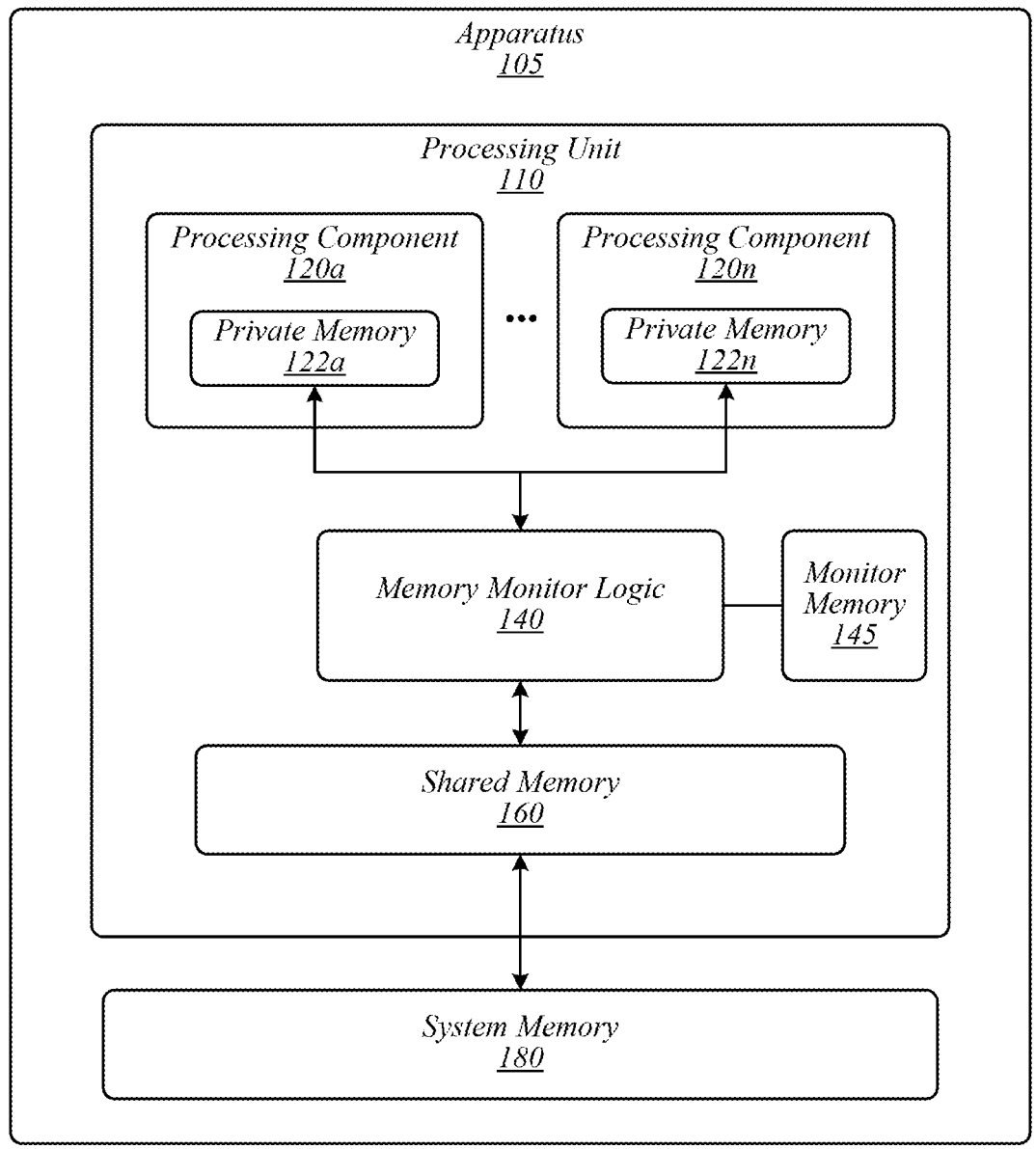
FIG. 1 illustrates an embodiment of a first operating environment.

Various embodiments may be generally directed to techniques for detecting and/or preventing memory attacks within a computing system. In some embodiments, the memory attacks may include various side-channel attacks on a memory component. In various embodiments, the memory component may include a cache memory. In some embodiments, the memory component may include a shared component, such as a last level cache (LLC) used by a plurality of components of a processing system (for example, a plurality of cores of a multi-core processor). In some embodiments, a memory monitor may observe memory activity, including memory reads and writes. In exemplary embodiments, the memory monitor may determine whether trusted data (for instance, private data associated with a system component) has been evicted from a cache and replaced by data from another process (for instance, an attacker process). In some embodiments, the memory monitor may determine that the trusted data is being reloaded to the cache and, in response, may initiate an operation to prevent reloading of the trusted data. In various embodiments, the memory monitor may store or cause the storage of the trusted data in an external location outside of the cache. In exemplary embodiments, the memory monitor may evict the attacker data from the cache. In some embodiments, after evicting the attacker data from the cache, the memory monitor may write or cause the writing of the trusted data back into the cache from the external location.

In some embodiments, the side-channel attack may include a timing or cache timing attack. In general, a cache timing attack may include an attack in which an attacker (for example, via an attacker process) attempts to compromise a system, such as a cryptosystem, by analyzing the time taken to execute associated algorithms, such as cryptographic algorithms. Certain cache timing attacks require both a malicious application (the attacking application) and the application being attacked (the victim application) to execute on the same core. However, certain other cache timing attacks do not require the attacking application and the victim application to be operating on the same core as these types of cache timing attacks operate based on shared resources between associated cores, such as an LLC. Such shared-resource cache timing attacks may be successful in a conventional system despite designed component isolation and access control because these types of attacks exploit the sharing of memory pages between non-trusting processes, which is a common method for reducing memory footprint. In addition, in conventional systems, most or even all processes may share one or more underlying resources, such as an LLC.

Illustrative cache timing attacks include the "flush+reload" (or "flush and reload") attack and the "prime+probe" (or "prime and probe") attack. In general, in these types of attacks, the attacker's data and the victim's data (for instance, encryption keys, tables, data structures, and/or the like) are co-resident in an LLC. The attacker launches the attack via an attacking process by flushing out the entire LLC (for example, via a clflush x86 instruction in an x86-based processor system). Once the data has been removed from the LLC, the attacker fills the LLC with their own data ("attacker data"). When the victim application that is the subject of the attack is executed, the victim application attempts to fetch its application data from the LLC. However, the attacker process has flushed the application data from the LLC. Accordingly, the victim application experiences a cache miss and attempts to reload the application data from main memory. During and/or after the application is being reloaded into the LLC, the attacking process accesses all blocks in the LLC while simultaneously timing accesses to every block. The attacking process may deduce that blocks that have a longer access time were fetched from main memory, while the blocks with shorter access times were in the LLC. Accordingly, the attacking process may identify which blocks in the cache belong to the victim application. Further analysis may be performed by the attacking process to derive additional information. For example, for a cryptographic victim application, the attacking process may perform further analysis to determine the cryptographic key based on the cryptographic algorithm being used by the victim application.

Cache timing attacks are successful within conventional computing systems because they can evict victim application data by flushing an entire (or substantially an entire) cache (for instance, an LLC), filling the cache with attacker data, and then timing memory accesses after the victim application reloads the victim application data. Accordingly, in some embodiments, a memory monitor may operate to monitor for potential attacker activity associated with a cache timing attack. A non-limiting example of attacker activity monitored by the memory monitor may include a process evicting data from a cache, for example, evicting all or substantially all of the data from the cache. Another non-limiting example of attacker activity monitored by the memory monitor may include a process evicting all, substantially all, or a certain portion of trusted data from the cache. In some embodiments, trusted data may include private data associated with a system component, data associated with a particular trusted application (for example, a cryptographic application, a firmware application, and/or the like), and/or the like. A further non-limiting example of attacker activity monitored by the memory monitor may include a process attempting to fill or substantially fill the cache with its own data. In some embodiments, whether activity is determined to be attacker activity may depend on the source of the activity. For example, eviction of a shared memory by a trusted application (for instance, an application associated with a system component, an application designated as being a trusted application, and/or the like) may not be determined to be attacker activity, while the same action by a non-trusted application may be determined to be attacker activity.

In exemplary embodiments, a memory monitor may operate to monitor one or more memory components for attacker activity in order to prevent a memory attack. For example, in some embodiments, the memory monitor may determine whether data, such as trusted data, has been evicted from a cache by another process (for instance, an attacker process) and/or whether a process attempts to load its own data in the cache (for instance, to fill the cache with its own data). The memory monitor may operate to perform various attack prevention processes, including, without limitation, storing the evicted trusted data, performing a writeback invalidate operation before the trusted data is reloaded (from system memory) into the cache, write the stored trusted data into the cache, and/or the like.

Conventional side-channel attack countermeasures, such as cache coloring and dynamic cache size partitioning, have become less effective and incur unacceptably-high performance overheads. For example, conventional side-channel attack countermeasures may incur performance overheads in the range of 25-50%, which are not acceptable for expected performance requirements. Accordingly, the memory monitor and attack prevention processes according to some embodiments may operate to prevent memory attacks, such as side-channel attacks, memory timing attacks, and/or the like with low performance impact. For example, attack prevention processes according to various embodiments may allow a memory, such as the LLC, to be available to all components as designed, and flushes the memory only when the memory monitor predicts a memory attack scenario.

In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner FIG. 1 illustrates an example of an operating environment 100 that may be representative of some embodiments. As shown in FIG. 1, operating environment 100 may include an apparatus having a processing unit 110, such as a central processing unit (CPU), system-on-a-chip (SoC), a processor die, an accelerator device, an I/O device, a memory device, and/or the like. In some embodiments, processing unit 110 may include one or more processing components 120a-n, such as processing cores. For example, processing unit 110 may be or may include a multi-core processor. In various embodiments, one or more of processing components 120a-n may include a private system memory 272a-n. In exemplary embodiments, private system memory 272a-n may include a memory accessible only by the corresponding processing component 120a-n associated with the private memory. For example, a private system memory 272a-n may include one or more private cache memories for a processing component 120a-n, such as a processing core. In another example, processing components 120a-n may include cores having private memories 122a-n implemented as caches, which may be employed as a first-level cache (L1), an L1 and second-level cache (L2), an instruction cache, a data cache, combinations thereof, and/or the like.

Processing unit 110 may include and/or may access a shared memory 160, such as an LLC (for instance, implemented as a third-level cache (L3)). Each of processing components 120a-n may be operable to store and/or access data from shared memory 160. In some embodiments, a memory monitor logic 140 may be communicatively coupled to shared memory 160 and configured to monitor memory operations associated with shared memory 160 and/or data stored in shared memory 160. Memory monitor 140 may be implemented in hardware, software, or any combination thereof. In one exemplary embodiments, memory monitor 140 may be implemented in hardware and software. In some embodiments, memory monitor 140 may be on the same die as processing unit 110. In various other embodiments, memory monitor 140 may be arranged external to the die of processing unit 110, for example, communicatively coupled to processing unit 110 and/or components thereof (for instance, processing components 120a-n, shared memory 160, and/or the like). In one exemplary embodiments, memory monitor 140 may be arranged on the same die as processing unit 110.

In exemplary embodiments, memory monitor logic 140 may include or may be operably coupled to a monitory memory 145. Memory monitor logic 140 may store data in monitor memory 145, such as data evicted from shared memory 160 and/or data provided by processing components 120a-n for writing to shared memory 160. In some embodiments, apparatus may include a system memory 180 operably coupled to shared memory 160 and/or memory monitor logic 140.

In various embodiments, memory operations and/or data from processing components 120a-n to shared memory 160 may be provided to memory monitor logic 140. For example, in some embodiments, if processing component 120a seeks to write data to shared memory 160, processing component 120a may provide a write command and the data to memory monitor logic 140. Memory monitor logic 140 may store the data in monitor memory 145. Memory monitor logic 140 may handle, or cause to be handled, the write command to write the data from monitor memory 145 to shared memory. In some embodiments, processing components 120a-n may execute memory operations directly with shared memory 160, for example, with memory monitor logic 140 reading the commands and/or analyzing the data to determine which commands and data are involved in the memory operations. Embodiments are not limited in this context.

In exemplary embodiments, memory monitor logic 140 may operate to detect attacker activity indicating a potential memory attack (see, for example, FIGS. 4A-E) (for instance, a flush and reload attack or a prime and probe). Furthermore, in various embodiments, memory monitor logic 140 may perform various attack prevention processes to prevent a detected memory attack. For example, memory monitor logic 140 may be operative to determine whether data stored in, being written to, and/or being read from shared memory 160 is trusted data (for instance, private data associated with a system component) or non-trusted data. In another example, memory monitor logic 140 may be operative to determine whether data is being evicted from all, substantially all, or a threshold portion of shared memory 160. For example, memory monitor logic 140 may detect whether a "flush" memory (for instance, "clflush," flush cache line instruction, flush cache instruction, and/or the like) command has been initiated by one or more of processing components 120a-n. In general, a flush memory command may operate to evict, remove, move, delete, or otherwise flush data from a memory.

Figure 2:
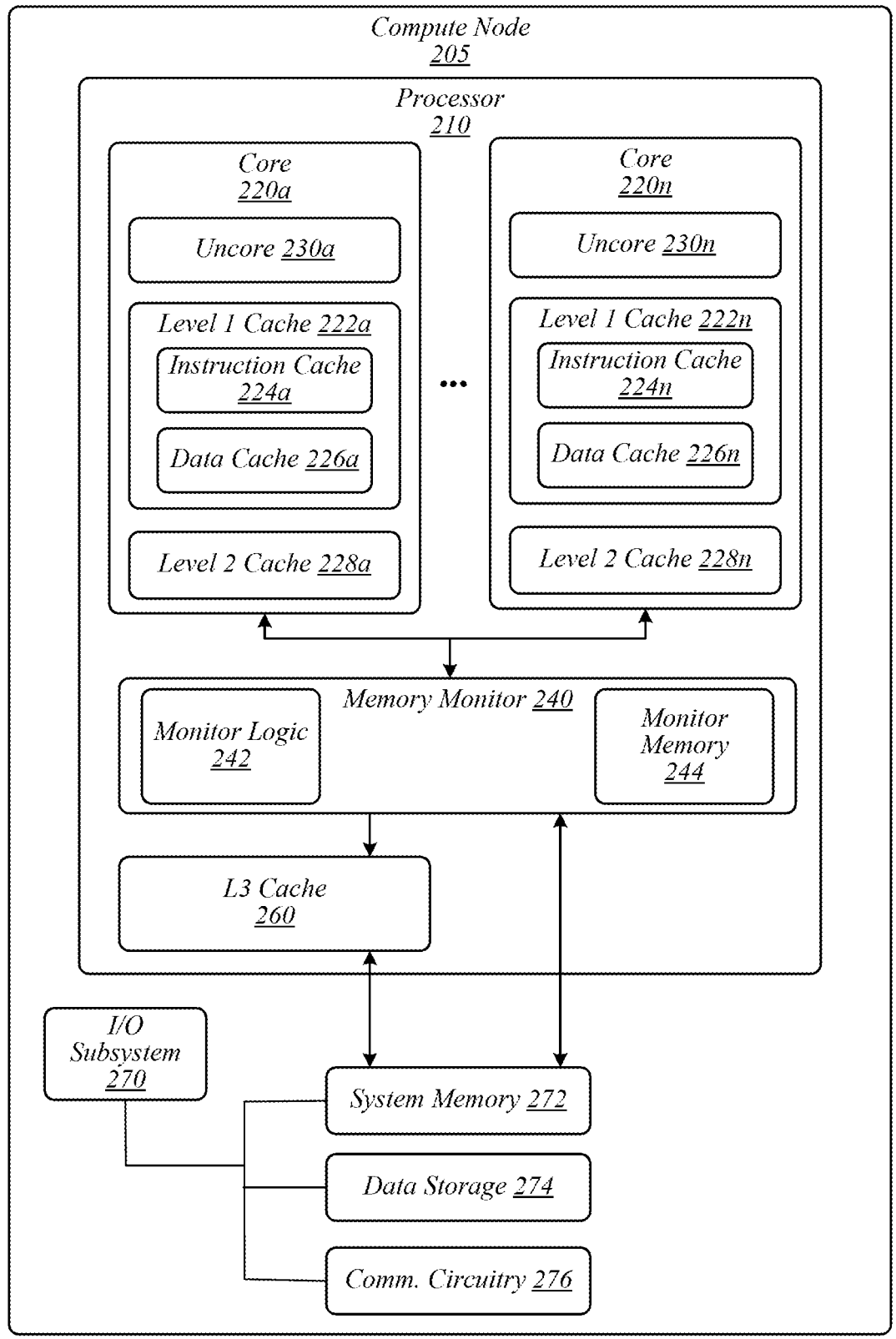
FIG. 2 illustrates an embodiment of a second operating environment.

FIG. 2 illustrates an example of an operating environment 200 that may be representative of some embodiments. As shown in FIG. 2, operating environment 200 may include a compute node 205. In various embodiments, compute node 205 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, a consumer electronic device, combinations thereof, and/or the like. Compute node 205 may include at least one processor 210, an input/output (I/O) subsystem 270, a system memory 272, a data storage device 274, communication circuitry 276, and/or the like. Communication circuitry 276 may include one or more transceivers, radios, or other components operative to facilitate communication over a network. Compute node 205 may include other or additional components, such as those commonly found in a server device (for instance, transceivers, I/O devices, peripheral cards, and/or the like). Additionally, in some embodiments, one or more of the components of compute node 205 may be incorporated in, or otherwise form a portion of, another component.

Processor 210 may be embodied as any type of processor capable of performing functions according to some embodiments. In some embodiments, processor 210 may include a multi-core processor, however, in various other embodiments, each processor 210 may be embodied as a single or multi-core processor(s), digital signal processor, microcontroller, architecture, microarchitecture, or other processor or processing/controlling circuit. Processor 210 may include a plurality of cores 220a-n, such as two cores 220a-n, four cores 220a-n, and/or the like, and an uncore 230a-n. In some embodiments, compute node 205 may be configured to implement one or more virtual machines such that a portion of processors 210 and/or cores 220a-n may be virtual processors and/or cores. In various embodiments, at least a portion of processors 210 may include a CPU, graphics processing unit (GPU), system-on-a-chip (SoC), an accelerator, and/or the like.

Processors 210 may include an uncore 230a-n. In various embodiments, each uncore 230a-n may generally include any part of a particular processor 210 not included in processor cores 220a-n (for instance, all or substantially all components of processor 210 except for processor cores 220a-n themselves). For example, uncores 230a-n of processor 210 may include typical components of a processor or a system-on-a-chip (SoC). For example, each uncore 230a-n may include a memory controller, processor graphics, I/O controllers, power management circuitry, or other components of processor 210, processor monitors, cache memory, and/or the like. Cores 220a-n may include cache memories, such as a level 1 (L1) cache 222a-n and a level 2 (L2) cache 228a-n. In various embodiments, L1 cache 222a-n may include in instruction cache (or i-cache) 224a-n and/or a data cache 226a-n. L1 caches 222a-n and/or L2 caches 228a-n may be "private" caches because they are only accessible by the core 220a-n associated therewith.

Processor 210 may include or may have access to a L3 cache 260. In some embodiments, L3 cache 260 may be a "shared" cache in which multiple cores 220a-n may access L3 cache and perform memory operations with L3 cache 260. In various embodiments, a memory monitor 240 may be configured to monitor memory operations within processor 210, such as memory operations involving L3 cache 260. Memory monitor 240 may include monitor logic 242 operative to perform memory monitoring operations according to some embodiments. For example, monitor logic 242 may perform memory monitoring operations to detect memory attacks involving L3 cache 260. In another example, monitor logic 242 may perform memory monitoring operations to stop, prevent, or otherwise obstruct a memory attack involving L3 cache 260 (see, for example, FIGS. 4A-E). In exemplary embodiments, memory monitor 240 may include monitor memory 244 configured to store data. For example, monitor memory 244 may temporarily store data from one of cores 220*a-n* to be stored in L3 cache. In another example, monitor memory 244 may store data (for instance, trusted data) evicted from L3 cache. In some embodiments, memory operations initiated by cores 220*a-n* may be transmitted or otherwise provided to memory monitor 240 for analysis, for example, to determine whether the memory operations may be a part of a memory attack.

In various embodiments, system memory 272 may be embodied as any type of volatile or non-volatile memory or data storage. In operation, system memory 272 may store various data and software used during operation of compute node 205, such as OSs, applications, programs, code, code elements, libraries, drivers, agents, and/or the like. System memory 272 may be communicatively coupled to processor 210 via I/O subsystem 270, which may be embodied as circuitry and/or other components operative to facilitate I/O operations with processor 210, system memory 272, and/or other components of compute node 205. For example, I/O subsystem 270 may be embodied as, or otherwise include, memory controller hubs, I/O control hubs, firmware devices, communication links (for instance, point-to-point links, bus links, wires, cables, light guides, printed circuit board traces, and/or the like), and/or other components and subsystems to facilitate input/output operations. In some embodiments, I/O subsystem 270 may form a portion of a SoC and may be incorporated, along with processor 210, system memory 272, and other components of compute node 205, on a single integrated circuit chip.

Data storage device 274 may be embodied as any type of device or devices configured for short-term or long-term storage of data such as, for example, memory devices and circuits, memory cards, hard disk drives, solid-state drives, and/or other data storage devices. Communication circuitry 276 may be embodied as any communication circuit, device, or collection thereof, capable of enabling communications between compute node 205 and other devices, such as other compute nodes, over a network. Communication circuitry 276 may be configured to use various communication technologies (for instance, wired or wireless communications) and associated protocols (for instance, Ethernet, Bluetooth®, Wi-Fi®, WiMAX, and/or the like) to affect such communication.

Figure 3:
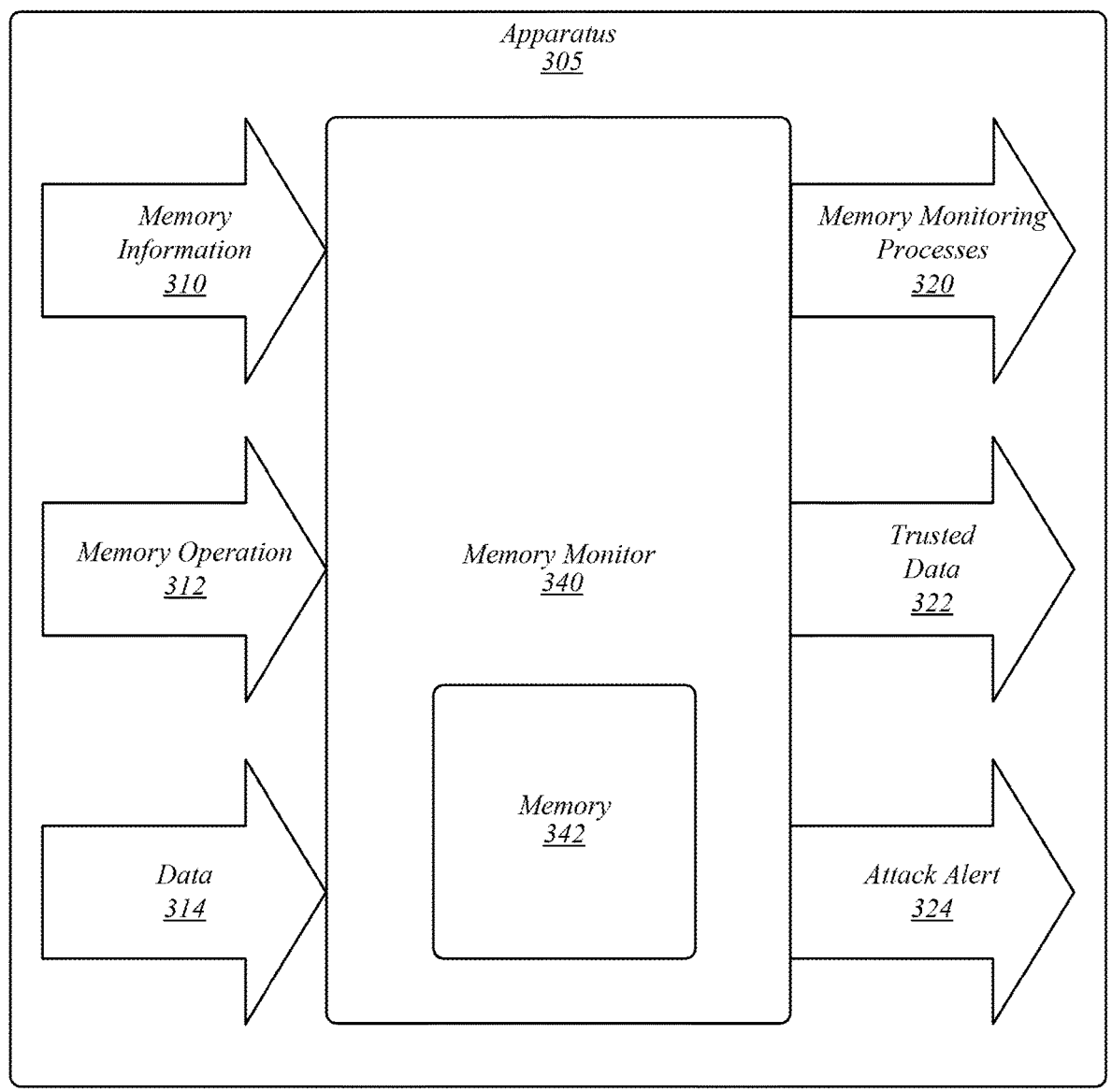
FIG. 3 illustrates an embodiment of a third operating environment.

FIG. 3 illustrates an example of an operating environment 300 that may be representative of some embodiments. As shown in FIG. 3, an apparatus 305 may include a memory monitor 340 operative to perform memory monitoring processes according to some embodiments. Memory monitor 340 may receive, access, or otherwise obtain memory information 310 associated with one or more shared memory components (not shown) of apparatus 305 (for example, shared memory 160 or L3 cache 260). In exemplary embodiments, memory information 310 may include information associated with data stored in a shared memory component being monitored by memory monitor. Non-limiting examples of memory information 310 may include whether data is trusted data, a source of the data (for example, which core is the data associated with), and/or the like. In some embodiments, memory monitor 340 may be operative to analyze data stored or as the data is being stored in a shared memory of apparatus 305 to determine the memory information.

In various embodiments, memory monitor 340 may receive memory operations 312 for example, to determine the type of memory operation and/or a source of the memory operation. In some embodiments, memory operations 312 may include information associated with memory operations (for instance, type of memory operation, source of memory operation, destination for memory operation, and/or the like) and/or the actual memory operation (for example, a write command, a read command, a delete command, a flush command, and/or the like). For instance, components (for example, cores) of processing circuitry of apparatus 305 may provide memory operations to memory monitor 340 for memory monitor to provide to a shared memory (for example, an LLC) of apparatus 305. In such an embodiment, memory monitor 340 may operate as an intermediary for the components of the processing circuitry and the shared memory. In another instance, the components of the processing circuitry may provide memory operations directly to the shared memory, and memory monitor 340 may analyze (for example, watch or "snoop") the memory operations.

Memory monitor 340 may receive data 314 from components of processing circuitry of apparatus 305 and/or a system memory of apparatus 305. For example, a core of processing circuitry of apparatus 305 may provide data to memory monitor 340 to store in a shared memory of apparatus 305 as part of a write memory operation initiated by the core. In another example, memory monitor 340 may obtain data from the shared memory, and provide the data to the core of processing circuitry of apparatus 305 as part of a read memory operation. In a further example, memory monitor 340 may obtain data from a main memory (for instance, trusted data) to be written to the shared memory as a result of a cache miss. In such embodiments, memory monitor 340 may store the data in a memory 342 before writing the data to the shared memory or providing the data to the core of the processing circuitry of apparatus 305.

Memory monitor 340 may provide memory monitoring processes 320 associated with a shared memory and components of processing circuitry of apparatus 305. In some embodiments, memory monitoring processes 320 may be operative to detect and/or prevent memory attacks. For example, memory monitoring processes 320 may analyze memory operations of components of processing circuitry of apparatus 305 for attacker activity, such as evicting trusted data from a shared memory of apparatus 305 (for instance, via a flush command). In another example, memory monitoring processes 320 may operate to store trusted data evicted from the shared memory (for instance, holding the trusted data until a determination is made whether a memory attack has been initiated). In a further example, memory monitoring processes 320 may determine whether a process, such as an attacker process, has filled the shared memory with its own data (for instance, based on whether the shared memory is filled, substantially filled, or filled above a threshold level with the data of a single application). In an additional example, memory monitoring processes 320 may flush the shared memory of apparatus 305 (for instance, via a writeback invalidation operation) responsive to detection of memory attack activity, including, without limitation, detection of eviction of some or all trusted data from the shared memory and a process filling or attempting to fill the shared memory with its own data.

In some embodiments, memory monitor 340 may provide trusted data 322. For example, memory monitor 340 may provide trusted data 322 (of a victim process) from a system memory of apparatus 305 to a shared memory of apparatus 305. Memory monitor 340 may obtain trusted data 322 from a system memory of apparatus 305 during or during resolution of a memory attack, for instance, in response to a victim application seeking to reload data in the shared memory from the system memory in response to a cache miss. In various embodiments, memory monitor 340 may store the trusted data 322 in memory 342, and write the trusted data 322 to the shared memory, for example, after flushing the shared memory (of attacker process data).

In exemplary embodiments, memory monitor 340 may generate an attack alert 324 responsive to determining that a memory attack or a potential memory attack is active within apparatus 305. For example, memory monitor 340 may provide an attack alert 324 to software and/or hardware of apparatus 305, such as to an operating system (OS) of apparatus. The attack alert 324 may include attack information associated with the memory attack that triggered the attack alert 324, such as time stamp information, processing circuitry associated with the attack, processor components (for instance, cores) associated with the attack, victim process information, attacker process information, attacker activity (for instance, memory operations and/or the like). The OS and/or an application operating on the OS may provide an alert or log entry for a system administrator or other user.

FIGS. 4A-E illustrate an example of an operating environment 400 that may be representative of some embodiments. In general, FIGS. 4A-E depict a memory monitoring process according to exemplary embodiments within operating environment 400 operative to detect and prevent a memory attack. As shown to FIG. 4A, operating environment 400 may include apparatus 405 having a plurality of processor cores, including an attacker core 420a and a victim core 420b. Attacker core 420a may include a core executing an attacker application attempting to implement a memory attack within apparatus 405. Victim core 420b may include a core executing an application, such as a trusted application (for example, a cryptographic application), that is a target of the memory attack.

Apparatus 405 may include a memory monitor 440 operative to monitor memory operations involving shared memory 460. In some embodiments, shared memory 460 may include an LLC used by cores 420a and 420b. In various embodiments, shared memory 460 may include memory blocks 462a-p (or other memory units, segments, and/or the like). In some embodiments, as described in more detail below, memory monitor may monitor transactions involving shared memory 460 to detect whether a cache timing attack is being launched, and performs preventative processes, including, without limitation, performing a writeback invalidate operation before trusted data may be reloaded into shared memory 460. Apparatus 405 may further include a system memory 480 operatively coupled to shared memory 460 and/or memory monitor 440.

Figure 4A:
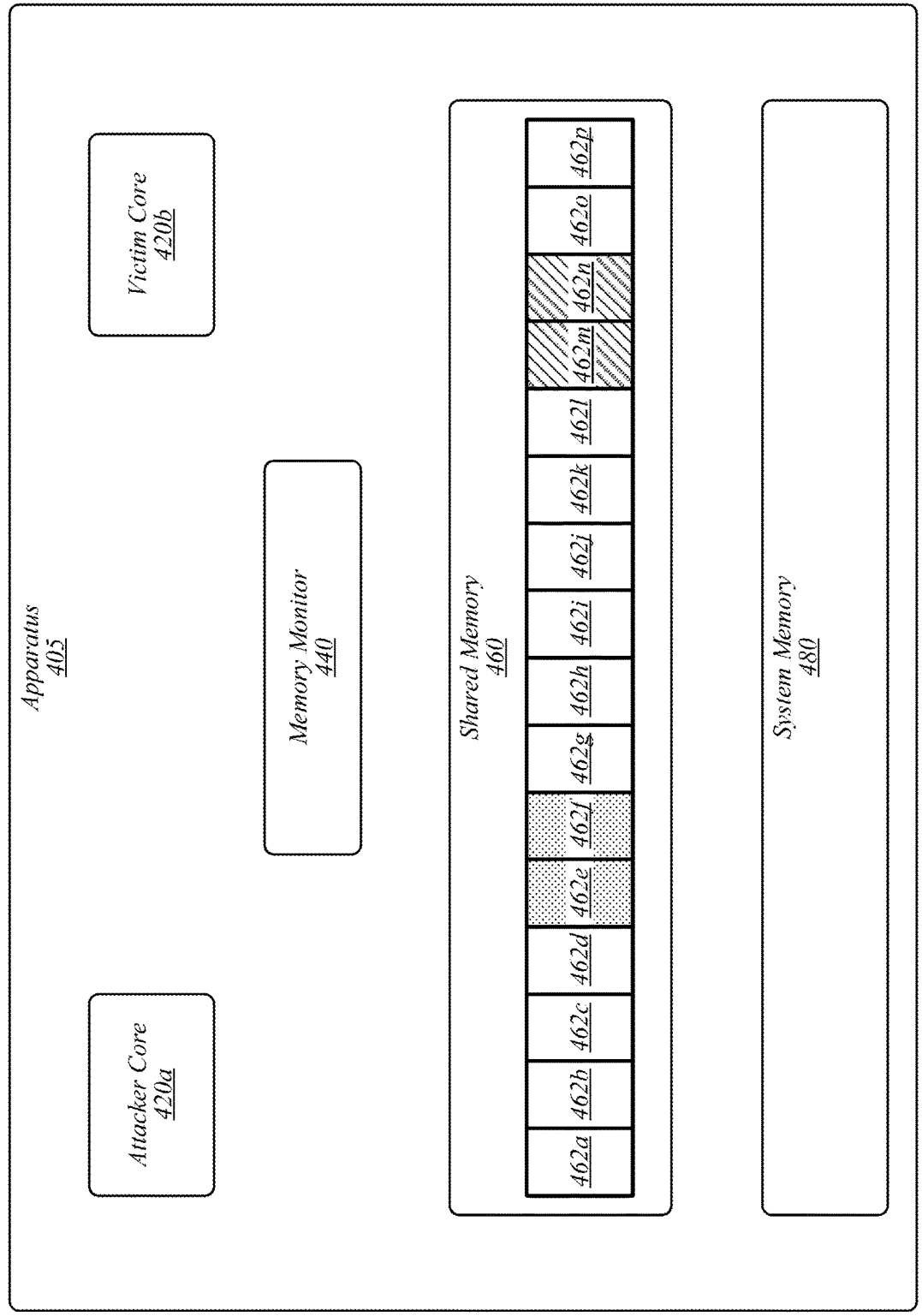
FIGS. 4A-E illustrate an embodiment of a fourth operating environment.

Referring to FIG. 4A, the target or victim may include a trusted application being executed by victim core 420b. Data (for instance, trusted data) of the trusted application may be stored within shared memory 460, such as at blocks 462m and 462n. The attacker or malicious application may be operating on a different core, namely attacker core 420a. In addition, attacker data of the attacker application may be stored within shared memory 460 (although not necessary), such as at blocks 462e and 462f.

Figure 4B:
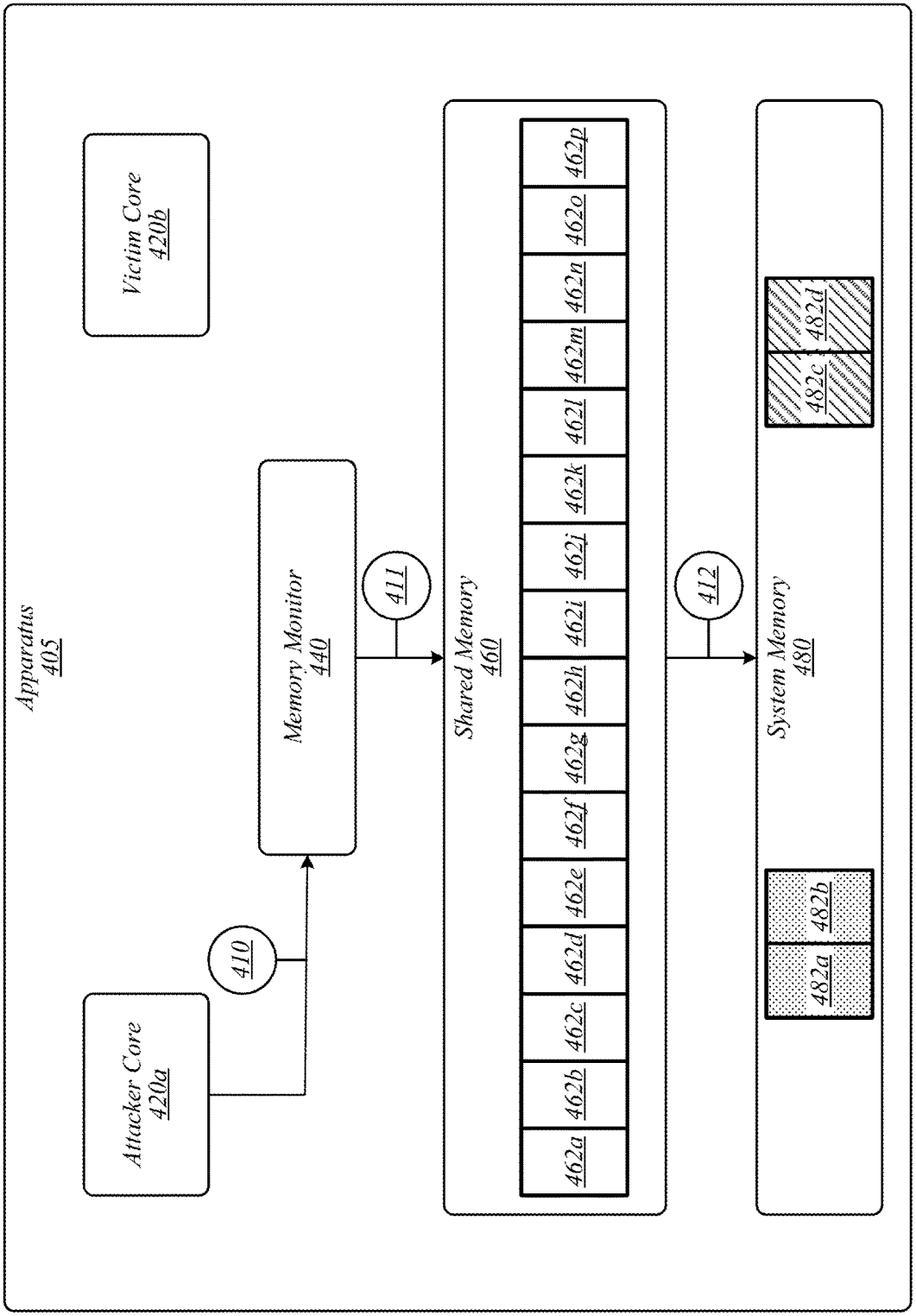

As shown in FIG. 4B, attacker core 420a initiates attacker activity. More specifically, attacker core 420a flushes out data from shared memory 460. For example, attacker application via attacker core 420a may initiate a flush memory operation or command (for instance, a "clflush" command) 410 to evict all data from shared memory 460. The flushed data may be written 412 to system memory 480, for example, in blocks 482a-d. In various embodiments, memory monitor 440 may determine that attacker activity in the form of a data eviction event 411 has occurred involving shared memory 460. In some embodiments, memory monitor 440 may determine that a data eviction event has occurred responsive to all or substantially all of the data being evicted from shared memory 460. In various embodiments, memory monitor 440 may determine that a data eviction event has occurred responsive to a threshold amount of data being evicted from shared memory 460. In exemplary embodiments, memory monitor 440 may determine that a data eviction event has occurred responsive to specific data being evicted from shared memory, such as trusted data or all or substantially all trusted data (for instance, while non-trusted data is retained). In some embodiments, memory monitor 440 may determine that a data eviction event has occurred responsive to determining that a memory flush or other eviction command has been issued involving shared memory 460. Embodiments are not limited in this context.

For example, memory monitor 440 may determine that a core (for instance, attacker core 420a) has issued a command to flush all or substantially all data from shared memory 460. In some embodiments, memory monitor 440 may receive or otherwise access memory operations from cores 420a and 420b. For example, in exemplary embodiments, memory operations from cores 420a and 420b may be provided to memory monitor 440 to then provide to shared memory 460 (for instance, memory monitor 440 may operate as an intermediary between cores 420a and 420b and shared memory 460). In another example, according to various embodiments, cores 420a and 420b may provide memory operation commands directly to shared memory 460, while memory monitor 440 may monitor (or "snoop") the memory operation commands.

In various embodiments, memory monitor 440 may determine that an eviction event has occurred by analyzing the data content of shared memory 460 (for instance, without accessing memory operation commands). For example, memory monitor 440 may determine that an eviction event has occurred responsive to the data stored in shared memory 460 being removed from shared memory 460 such that shared memory 460 is not storing any or substantially any data (for instance, indicating that the shared memory 460 has been flushed).

Figure 4C:
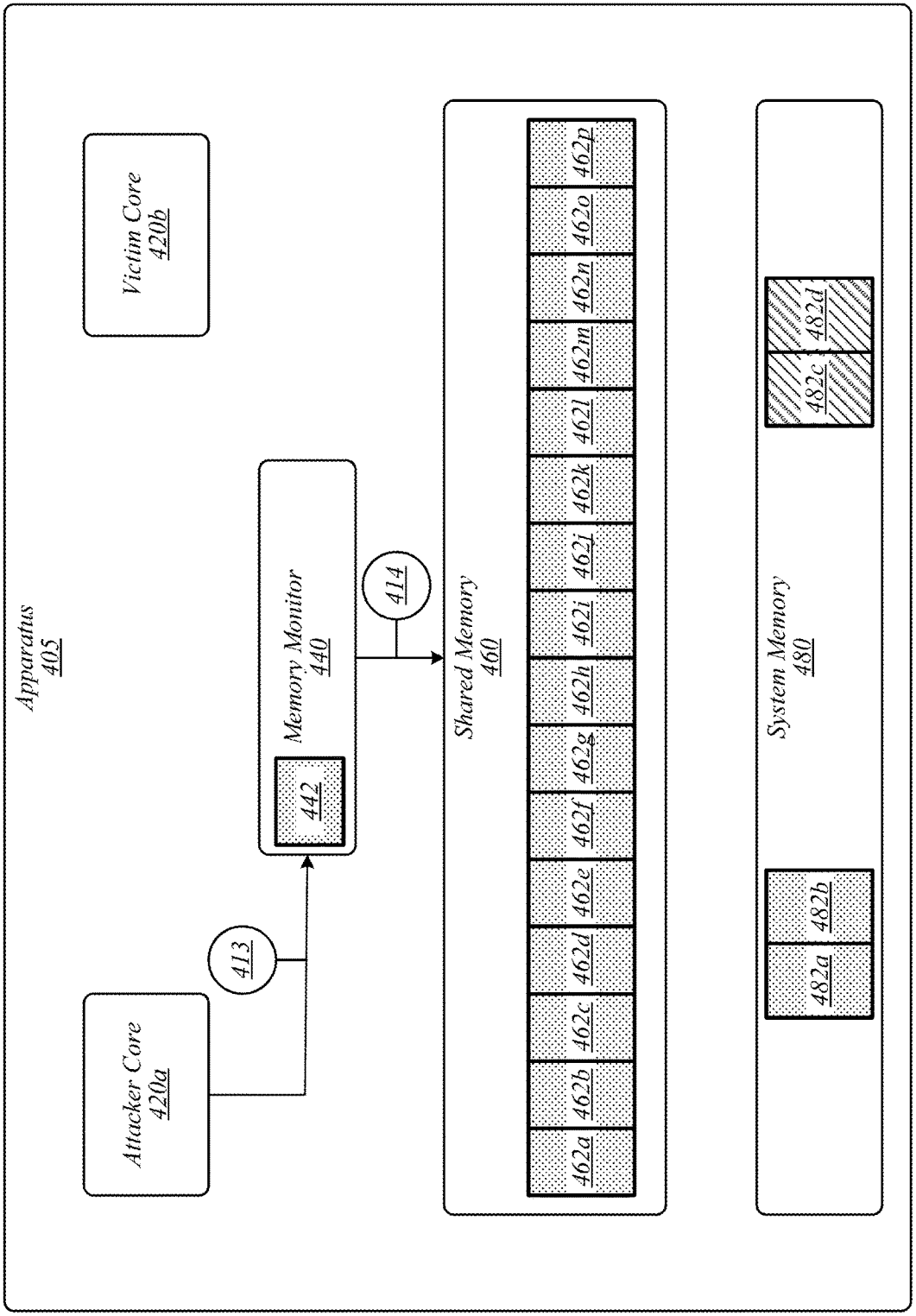

Referring to FIG. 4C, the attacker process fills shared memory 460 with attacker data. For example, attacker core 420 may provide a write command 413 to write attacker data to blocks 462a-p of shared memory 460. In some embodiments, memory monitor 440 may receive data from cores 420a and 420b to be written to shared memory 460. As shown in FIG. 4C, memory monitor 440 may receive attacker data 442 associated with write command 413 and memory monitor 440 may subsequently write the attacker data within memory blocks 462a-p of shared memory. In various embodiments, memory monitor 440 may determine that attacker activity in the form of a memory fill event 414 has occurred responsive to attacker core 420 filling, substantially filling, or filling above a threshold amount shared memory 460 with data. In various embodiments, memory monitor 440 may determine that a memory fill event 414 has occurred responsive to shared memory 460 being filled, substantially filled, or filled above a threshold amount with data from a single application (or a number of applications below a threshold amount). In some embodiments, memory monitor 440 may determine a type of data 442 and/or data stored in shared memory 460, such as trusted data, non-trusted data, potential attacker data, and/or the like. In some embodiments, memory monitor 440 may determine a source of data 442 and/or data stored in shared memory 460.

Figure 4D:
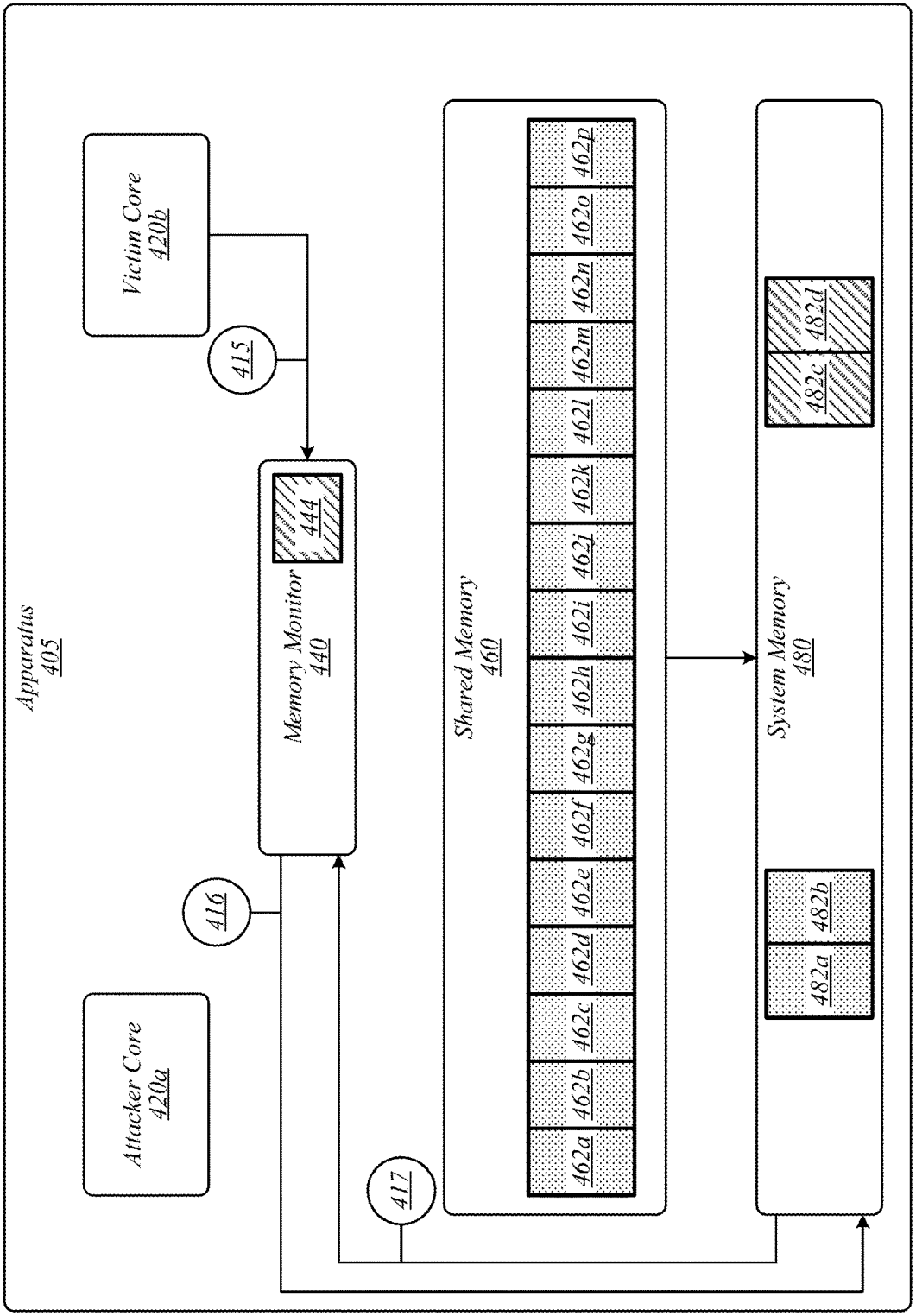

Referring to FIG. 4D, victim core 420b may attempt to access data 415 in shared memory 460 to resume operation. However, the victim data has been evicted from shared memory 460. Accordingly, victim core 420b may attempt to reload trusted data 416 from system memory, such as from blocks 482c and 482d. In a conventional system, a victim application may reload evicted data from a system memory to the shared cache. In some embodiments, trusted data 444 may be written 417 to memory monitor 440 and stored in memory monitor 440 (for example, in an associated memory) prior to being written to shared memory 460.

Figure 4E:
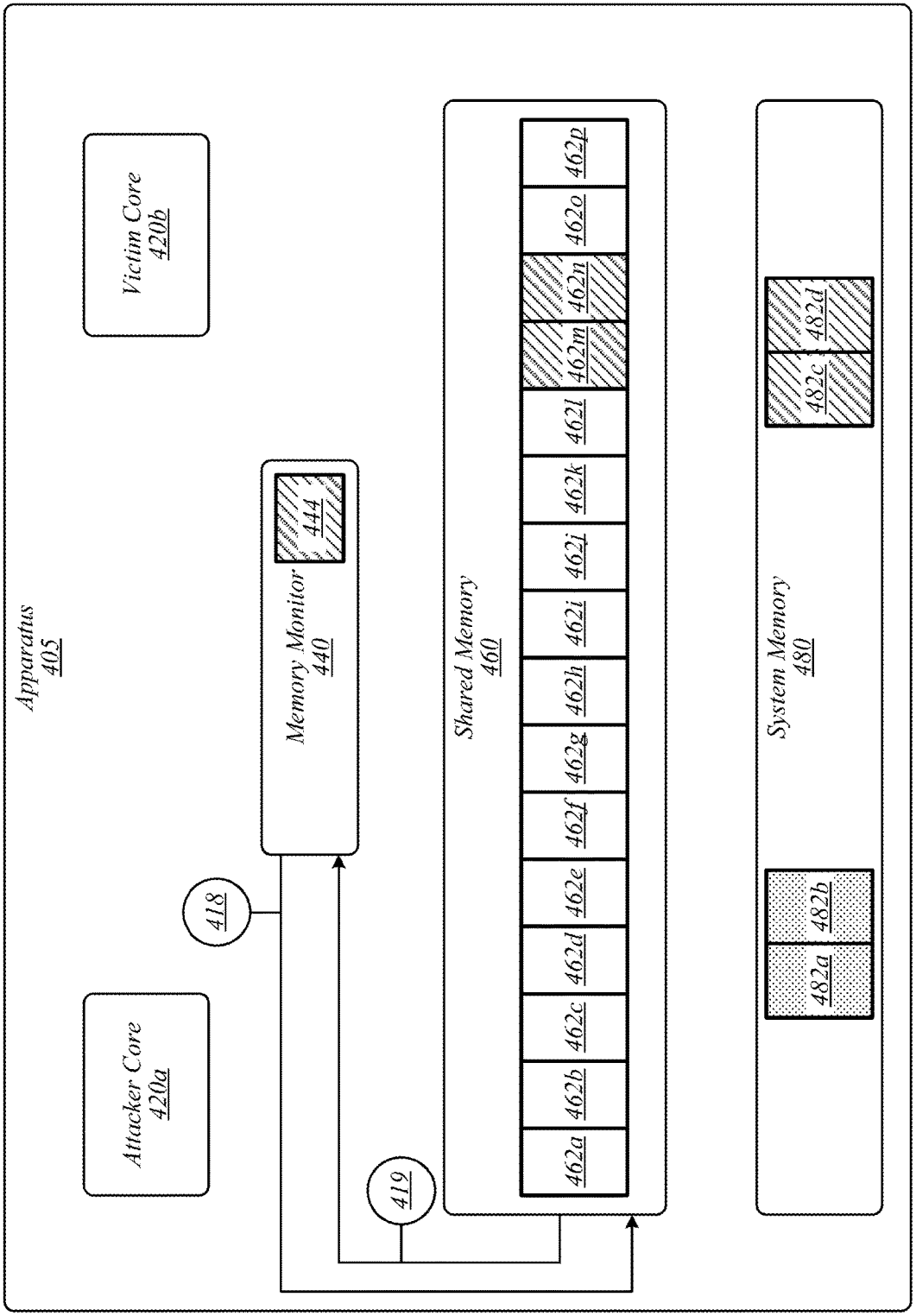

Referring to FIG. 4E, memory monitor 440 may evict 418 all of substantially all of the data from shared memory 460. For example, memory monitor 440 may perform or cause to be performed a writeback invalidate operation to evict 418 the data from shared memory 460 (for instance, flushing the attacker data from shared memory 460). Memory monitor 440 may write 419 trusted data 444 to shared memory 460, for example, to blocks 462m and 462n, responsive to eviction of all of substantially all of the data from shared memory 460. In this manner, attempts by the attacker process to perform timing analysis on data associated with the victim application are prevented. Accordingly, the attacker process may be prevented from extracting information associated with the victim process, such as cryptographic structures associated with a cryptographic victim application to deduce an encryption key.

Included herein are a set of logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 5A:
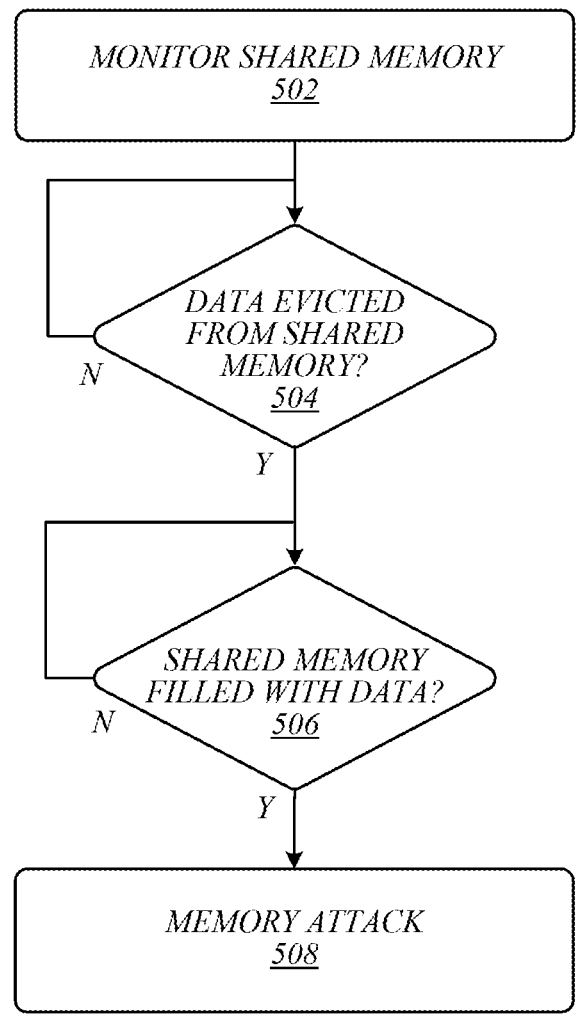
FIG. 5A illustrates an embodiment of a first logic flow.

FIG. 5A illustrates an embodiment of a logic flow 500A. Logic flow 500A may be representative of some or all of the operations executed by one or more embodiments described herein, such as operations executed by one or more of apparatuses 105 and 305 and/or compute node 205. For example, logic flow 500A may generally include operations for a memory monitor of a compute node to detect a memory attack.

At block 502, logic flow 500A may monitor a shared memory. For example, memory monitor 440 may monitor memory operations and/or data associated with shared memory 460. In some embodiments, monitoring of memory operations may include tracking and/or analyzing memory commands from cores 420a and 420b for attacker activity. Logic flow 500A may determine whether data has been evicted from shared memory at block 504. For example, memory monitor 440 may determine that attacker core 420a has initiated a memory operation to evict data from shared memory 460, such as a flush command (for instance, a "clflush" command). In exemplary embodiments, memory monitor 440 may determine that a memory eviction event has occurred responsive to all, substantially all, or a threshold amount of data (for instance, trusted data) being evicted from shared memory 460. Logic flow 500A may determine whether a shared memory has been filled with data at block 506. For example, memory monitor 440 may determine whether shared memory 460 has been filled, substantially filled, or filled a threshold amount with data, such as data from a single application, a non-trusted application, and/or the like.

At block 508, logic flow 500A may determine that a memory attack has occurred. For example, if one or more attacker activity, such as data being evicted from shared memory as determined at block 504 and/or shared memory being filled with data as determined at block 506, is detected by memory monitor 440, memory monitor may determine that a memory attack is occurring. In some embodiments, a memory monitor may include a data store or database for storing information associated with processing components (for instance, cores), shared memory (for instance, an LLC), trusted and/or non-trusted data, trusted and/or non-trusted applications, attacker activity, events, and/or the like. In various embodiments, the database may include flags and/or the like for indicating whether certain attacker activity has occurred. For example, an eviction flag may be set responsive to a memory monitor determining that data has been evicted from shared memory. In some embodiments, determination of whether a memory attack has occurred may be based on which flags have been set (for instance, a memory attack is occurring if a data eviction flag is set followed by a shared memory filled flag).

Figure 5B:
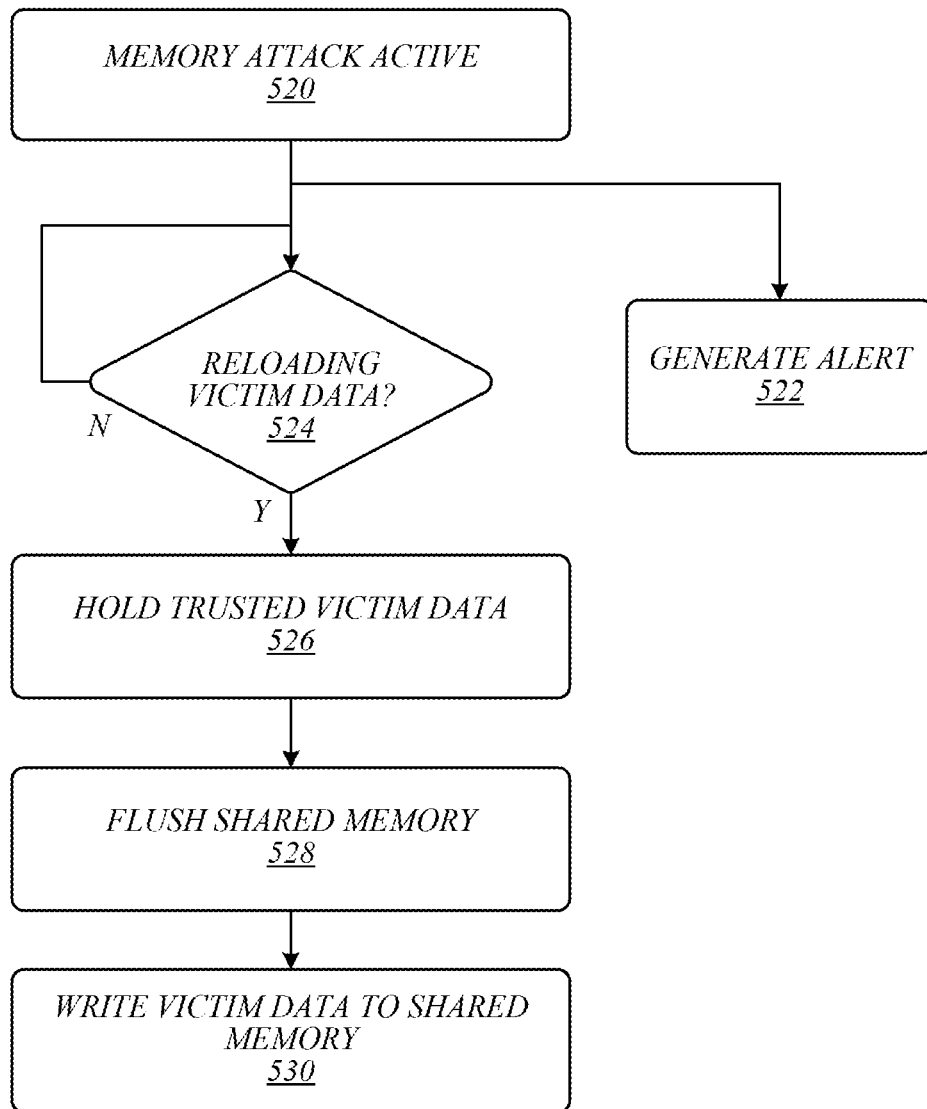
FIG. 5B illustrates an embodiment of a second logic flow.

FIG. 5B illustrates an embodiment of a logic flow 500B. Logic flow 500B may be representative of some or all of the operations executed by one or more embodiments described herein, such as operations executed by one or more of apparatuses 105 and 305 and/or compute node 205. For example, logic flow 500B may generally include operations for a memory monitor of a compute node prevent a memory attack.

At block 520, logic flow 500B may indicate a memory attack is active. For example, memory monitor 440 may determine that a memory attack is active involving shared memory 460 using logic flow 500A of FIG. 5A. In some embodiments, logic flow 500B may generate an alert at block 522. For example, memory monitor 340 may generate an attack alert 324 responsive to determining that a memory attack or a potential memory attack is active within apparatus. For example, memory monitor 340 may provide an attack alert 324 to software and/or hardware of apparatus 305, such as to an operating system (OS) of apparatus.

At block 526, logic flow 500B may determine whether victim data is being reloaded. For example, victim core 420b may attempt to reload trusted data 416 from system memory that has been evicted from shared memory 460 during a memory attack. Memory monitor 440 may be operative to detect a memory reload event in which trusted data is being reloaded (by a victim application and/or an attacker application) into shared memory 460. Logic flow 500B may hold trusted victim data at block 526. For example, trusted data 444 may be written 417 to memory monitor 440 and stored in memory monitor 440 prior to being written to shared memory 460.

Logic flow 500B may flush the shared memory at block 528. For example, memory monitor 440 may evict 418 all of substantially all of the data from shared memory 460. For example, memory monitor 440 may perform or cause to be performed a writeback invalidate operation to evict 418 the data from shared memory 460. At block 530, logic flow 500B may write victim data to shared memory. For example, Memory monitor 440 may write 419 trusted data 444 stored in a memory associated with memory monitor to shared memory 460.

Figure 6:
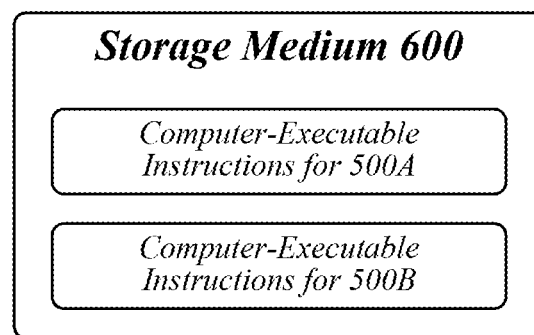
FIG. 6 illustrates an embodiment of a storage medium.

FIG. 6 illustrates an example of a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500A and/or logic flow 500B. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
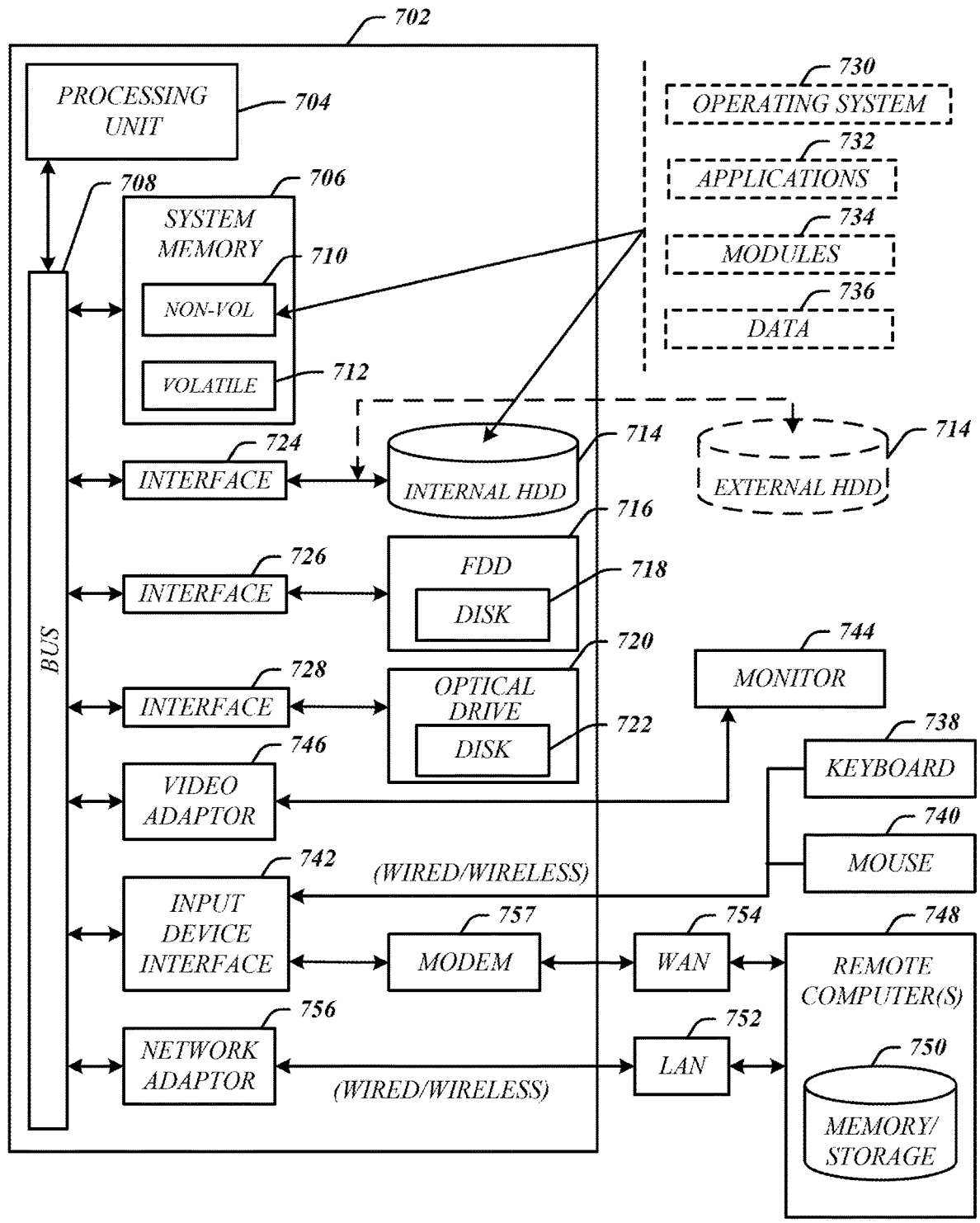
FIG. 7 illustrates an example computing platform.

FIG. 7 illustrates an embodiment of an exemplary computing architecture 700 suitable for implementing various embodiments as previously described. In various embodiments, the computing architecture 700 may comprise or be implemented as part of an electronic device. In some embodiments, the computing architecture 700 may be representative, for example, of apparatuses 105 and 305 and/or compute node 205. Embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of compute nodes 150, 405, 505, and/or 605 and server node 150.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1384 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following include non-limiting example embodiments:

Example 1 is an apparatus, comprising at least one memory comprising a shared memory and a system memory, logic, at least a portion of the logic comprised in hardware coupled to the at least one shared memory, the logic to implement a memory monitor to determine a memory attack by an attacker application against a victim application using the shared memory, and prevent the memory attack, the memory monitor to determine that victim data is being reloaded into the shared memory from the system memory, store the victim data in a monitor memory, flush shared memory data stored in the shared memory, and write the victim data from the monitor memory to the shared memory.

Example 2 is the apparatus of Example 1, the logic to implement the memory monitor to determine the memory attack based on a data eviction event.

Example 3 is the apparatus of Example 1, the logic to implement the memory monitor to determine the memory attack based on a data eviction event, the data eviction event comprises an eviction of all or substantially all of data in the shared memory.

Example 4 is the apparatus of Example 1, the logic to implement the memory monitor to determine the memory attack based on a data eviction event, the data eviction event comprises a flush memory instruction for the shared memory.

Example 5 is the apparatus of Example 1, the logic to implement the memory monitor to determine the memory attack based on a data eviction event, the data eviction event comprises a flush memory instruction for the shared memory, the flush memory instruction comprises a clflush command.

Example 6 is the apparatus of Example 1, the logic to implement the memory monitor to determine the memory attack based on a memory fill event.

Example 7 is the apparatus of Example 1, the logic to implement the memory monitor to determine the memory attack based on a memory fill event, the memory fill event comprises all or substantially all of the shared memory filled with data from a single application.

Example 8 is the apparatus of Example 1, the logic to implement the memory monitor to determine the memory attack based on a memory fill event, the memory fill event comprises all or substantially all of the shared memory filled with data from the attacker application.

Example 9 is the apparatus of Example 1, the logic to implement the memory monitor to determine the memory attack based on a memory fill event and a memory eviction event.

Example 10 is the apparatus of Example 1, comprising at least one processing unit having a first core and a second core, the first core comprising an attacker core executing the attacker application, the second core comprising a victim core executing the victim application.

Example 11 is the apparatus of Example 1, comprising processing circuitry communicatively coupled to the shared memory, the processing circuitry comprising a plurality of cores sharing the shared memory, the attacker application executed by a first core of the plurality of cores, the victim application executed by a second core of the plurality of cores.

Example 12 is the apparatus of Example 1, the shared memory comprises a last level cache (LLC).

Example 13 is the apparatus of Example 1, comprising processing circuitry communicatively coupled to the shared memory, the processing circuitry comprising a pluralit cores, the attacker application executed by a first core of the plurality of cores, the victim application executed by a second core of the plurality of cores, the shared memory comprising a last level cache (LLC) shared by the first core and the second core.

Example 14 is the apparatus of Example 1, the memory attack comprises one of a flush and reload attack or a prime and probe attack.

Example 15 is the apparatus of Example 1, the shared memory data comprises attacker data.

Example 16 is the apparatus of Example 1, comprising processing circuitry communicatively coupled to the shared memory, the processing circuitry comprising a plurality of cores sharing the shared memory, the logic to implement the memory monitor to receive memory operation commands from the plurality of cores.

Example 17 is the apparatus of Example 1, the logic to implement the memory monitor to flush the shared memory data stored in the shared memory via a writeback invalidate operation.

Example 18 is the apparatus of Example 1, the victim application comprises a cryptographic application.

Example 19 is the apparatus of Example 1, the victim data comprises trusted data associated with an apparatus component.

Example 20 is a system, comprising the apparatus according to any of Examples 1-19, and at least one transceiver.

Example 21 is a method, comprising determining a memory attack by an attacker application against a victim application using a shared memory, and preventing the memory attack by determining that victim data is being reloaded into the shared memory from a system memory, storing the victim data in a monitor memory, flushing shared memory data stored in the shared memory, and writing the victim data from the monitor memory to the shared memory.

Example 22 is the method of Example 21, comprising determining the memory attack based on a data eviction event.

Example 23 is the method of Example 21, comprising determining the memory attack based on a data eviction event, the data eviction event comprises an eviction of all or substantially all of data in the shared memory.

Example 24 is the method of Example 21, comprising determining the memory attack based on a data eviction event, the data eviction event comprises a flush memory instruction for the shared memory.

Example 25 is the method of Example 21, comprising determining the memory attack based on a data eviction event, the data eviction event comprises a flush memory instruction for the shared memory, the flush memory instruction comprises a clflush command.

Example 26 is the method of Example 21, comprising determining the memory attack based on a memory fill event.

Example 27 is the method of Example 21, comprising determining the memory attack based on a memory fill event, the memory fill event comprises all or substantially all of the shared memory filled with data from a single application.

Example 28 is the method of Example 21, comprising determining the memory attack based on a memory fill event, the memory fill event comprises all or substantially all of the shared memory filled with data from the attacker application.

Example 29 is the method of Example 21, comprising determining the memory attack based on a memory fill event and a memory eviction event.

Example 30 is the method of Example 21, comprising executing the attacker application on a first core of at least one processing unit having the first core and a second core, the first core comprising a victim core, and executing the victim application on the second core, the second core comprising an attacker core.

Example 31 is the method of Example 21, comprising executing the attacker application by a first core of a plurality of cores of a processing circuitry communicatively coupled to the shared memory, the plurality of cores sharing the shared memory, and executing the victim application by a second core of the plurality of cores.

Example 32 is the method of Example 21, the shared memory comprises a last level cache (LLC).

Example 33 is the method of Example 21, comprising executing the attacker application by a first core of a plurality of cores of a processing circuitry communicatively coupled to the shared memory, the plurality of cores sharing the shared memory, and executing the victim application by a second core of the plurality of cores, the shared memory comprising a last level cache (LLC) shared by the first core and the second core.

Example 34 is the method of Example 21, the memory attack comprises one of a flush and reload attack or a prime and probe attack.

Example 35 is the method of Example 21, the shared memory data comprises attacker data.

Example 36 is the method of Example 21, comprising receiving memory operation commands from a plurality of cores of a processing circuitry communicatively coupled to the shared memory, the plurality of cores sharing the shared memory.

Example 37 is the method of Example 21, comprising flushing the shared memory data stored in the shared memory via a writeback invalidate operation.

Example 38 is the method of Example 21, the victim application comprises a cryptographic application.

Example 39 is the method of Example 21, the victim data comprises trusted data associated with an apparatus component.

Example 40 is a computer-readable storage medium that stores computer-executable instructions for execution by processing circuitry of a compute node, the computer-executable instructions to cause the control node to enable a memory monitor operative to determine a memory attack by an attacker application against a victim application using the a shared memory, and prevent the memory attack by determining that victim data is being reloaded into the shared memory from a system memory, storing the victim data in a monitor memory, flushing shared memory data stored in the shared memory, and writing the victim data to the shared memory.

Example 41 is the computer-readable storage medium of Example 40, the computer-executable instructions to cause the compute node to enable the memory monitor operative to determine the memory attack based on a data eviction event.

Example 42 is the computer-readable storage medium of Example 40, the computer-executable instructions to cause the compute node to enable the memory monitor operative to determine the memory attack based on a data eviction event, the data eviction event comprises an eviction of all or substantially all of data in the shared memory.

Example 43 is the computer-readable storage medium of Example 40, the computer-executable instructions to cause the compute node to enable the memory monitor operative to determine the memory attack based on a data eviction event, the data eviction event comprises a flush memory instruction for the shared memory.

Example 44 is the computer-readable storage medium of Example 40, the computer-executable instructions to cause the compute node to enable the memory monitor operative to determine the memory attack based on a data eviction event, the data eviction event comprises a flush memory instruction for the shared memory, the flush memory instruction comprises a clflush command.

Example 45 is the computer-readable storage medium of Example 40, the computer-executable instructions to cause the compute node to enable the memory monitor operative to determine the memory attack based on a memory fill event.

Example 46 is the computer-readable storage medium of Example 40, the computer-executable instructions to cause the compute node to enable the memory monitor operative to determine the memory attack based on a memory fill event, the memory fill event comprises all or substantially all of the shared memory filled with data from a single application.

Example 47 is the computer-readable storage medium of Example 40, the computer-executable instructions to cause the compute node to enable the memory monitor operative to determine the memory attack based on a memory fill event, the memory fill event comprises all or substantially all of the shared memory filled with data from the attacker application.

Example 48 is the computer-readable storage medium of Example 40, the computer-executable instructions to cause the compute node to enable the memory monitor operative to determine the memory attack based on a memory fill event and a memory eviction event.

Example 49 is the computer-readable storage medium of Example 40, the computer-executable instructions to cause the compute node to enable the memory monitor operative to execute the attacker application on a first core of at least one processing unit having the first core and a second core, the first core comprising a victim core, and execute the victim application on the second core, the second core comprising an attacker core.

Example 50 is the computer-readable storage medium of Example 40, the computer-executable instructions to cause the compute node to enable the memory monitor operative to execute the attacker application by a first core of a plurality of cores of a processing circuitry communicatively coupled to the shared memory, the plurality of cores sharing the shared memory, and execute the victim application by a second core of the plurality of cores.

Example 51 is the computer-readable storage medium of Example 40, the shared memory comprises a last level cache (LLC).

Example 52 is the computer-readable storage medium of Example 40, the computer-executable instructions to cause the compute node to enable the memory monitor operative to execute the attacker application by a first core of a plurality of cores of a processing circuitry communicatively coupled to the shared memory, the plurality of cores sharing the shared memory, and execute the victim application by a second core of the plurality of cores, the shared memory comprising a last level cache (LLC) shared by the first core and the second core.

Example 53 is the computer-readable storage medium of Example 40, the memory attack comprises one of a flush and reload attack or a prime and probe attack.

Example 54 is the computer-readable storage medium of Example 40, the shared memory data comprises attacker data.

Example 55 is the computer-readable storage medium of Example 40, the computer-executable instructions to cause the compute node to enable the memory monitor operative to receive memory operation commands from a plurality of cores of a processing circuitry communicatively coupled to the shared memory, the plurality of cores sharing the shared memory.

Example 56 is the computer-readable storage medium of Example 40, the computer-executable instructions to cause the compute node to enable the memory monitor operative to flush the shared memory data stored in the shared memory via a writeback invalidate operation.

Example 57 is the computer-readable storage medium of Example 40, the victim application comprises a cryptographic application.

Example 58 is the computer-readable storage medium of Example 40, the victim data comprises trusted data associated with an apparatus component.

Example 59 is an apparatus, comprising at least one memory means comprising a shared memory and a system memory, a memory monitor means to determine a memory attack by an attacker application against a victim application using the shared memory, and prevent the memory attack, the memory monitor means to determine that victim data is being reloaded into the shared memory from the system memory, store the victim data in a monitor memory, flush shared memory data stored in the shared memory, and write the victim data from the monitor memory to the shared memory.

Example 60 is the apparatus of Example 59, the memory monitor means to determine the memory attack based on a data eviction event.

Example 61 is the apparatus of Example 59, the memory monitor means determine the memory attack based on a data eviction event, the data eviction event comprises an eviction of all or substantially all of data in the shared memory.

Example 62 is the apparatus of Example 59, the memory monitor means to determine the memory attack based on a data eviction event, the data eviction event comprises a flush memory instruction for the shared memory.

Example 63 is the apparatus of Example 59, the memory monitor means to determine the memory attack based on a data eviction event, the data eviction event comprises a flush memory instruction for the shared memory, the flush memory instruction comprises a clflush command.

Example 64 is the apparatus of Example 59, the memory monitor means to determine the memory attack based on a memory fill event.

Example 65 is the apparatus of Example 59, the memory monitor means to determine the memory attack based on a memory fill event, the memory fill event comprises all or substantially all of the shared memory filled with data from a single application.

Example 66 is the apparatus of Example 59, the memory monitor means to determine the memory attack based on a memory fill event, the memory fill event comprises all or substantially all of the shared memory filled with data from the attacker application.

Example 67 is the apparatus of Example 59, the memory monitor means to determine the memory attack based on a memory fill event and a memory eviction event.

Example 68 is the apparatus of Example 59, comprising at least one processing means having a first core and a second core, the first core comprising an attacker core executing the attacker application, the second core comprising a victim core executing the victim application.

Example 69 is the apparatus of Example 59, comprising processing circuitry means communicatively coupled to the shared memory, the processing circuitry comprising a plurality of cores sharing the shared memory, the attacker application executed by a first core of the plurality of cores, the victim application executed by a second core of the plurality of cores.

Example 70 is the apparatus of Example 59, the shared memory comprises a last level cache (LLC).

Example 71 is the apparatus of Example 59, comprising processing circuitry means communicatively coupled to the shared memory, the processing circuitry comprising a plurality of cores, the attacker application executed by a first core of the plurality of cores, the victim application executed by a second core of the plurality of cores, the shared memory comprising a last level cache (LLC) shared by the first core and the second core.

Example 72 is the apparatus of Example 59, the memory attack comprises one of a flush and reload attack or a prime and probe attack.

Example 73 is the apparatus of Example 59, the shared memory data comprises attacker data.

Example 74 is the apparatus of Example 59, comprising processing circuitry means communicatively coupled to the shared memory, the processing circuitry comprising a plurality of cores sharing the shared memory, the logic to implement the memory monitor to receive memory operation commands from the plurality of cores.

Example 75 is the apparatus of Example 59, the memory monitor means to flush the shared memory data stored in the shared memory via a writeback invalidate operation.

Example 76 is the apparatus of Example 59, the victim application comprises a cryptographic application.

Example 77 is the apparatus of Example 59, the victim data comprises trusted data associated with an apparatus component.

Example 78 is a system, comprising the apparatus according to any of examples 59-77, and at least one transceiver.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.112(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a shared memory;
a processing device coupled to the shared memory; and
memory monitor circuitry, coupled to the shared memory and the processing device, and arranged to:
identify a request to reload data into the shared memory by the processing device,
store the data in a monitor memory coupled to the memory monitor circuitry and flush the shared memory responsive to the reload request, and
write the data from the monitor memory to the shared memory.

2. The apparatus of claim 1, the processing device comprising a plurality of cores, the memory monitor circuitry arranged to:
identify a request to evict data from the shared memory by a first core of the plurality of cores of the processing device;
identify a request to fill the shared memory with data by the first core; and
identify an active memory attack by the first core responsive to identifying the request to evict data from the shared memory and the request to fill the shared memory with data by the first core.

3. The apparatus of claim 2, the memory monitor circuitry arranged to identify the request to reload data into the shared memory by a second core of the plurality of cores of the processing device responsive to identifying the active memory attack by the first core.

4. The apparatus of claim 3, the memory monitor circuitry arranged to identify the request to evict data from the shared memory responsive to: a request to evict a portion of data stored in the shared memory by the first core, a request to evict specific data from the shared memory by the first core, a request to evict, by the first core, data from the shared memory associated with the second core, or a memory flush command issued for the shared memory by the first core.

5. The apparatus of claim 3, the memory monitor circuitry arranged to identify the request to fill the shared memory with data by the first core responsive to a request to fill all or substantially of the shared data by the first core.

6. The apparatus of claim 3, the memory monitor circuitry arranged to evict data stored in the shared memory associated with the first core to flush the shared memory responsive to the reload request.

7. The apparatus of claim 1, the memory monitor circuitry arranged to identify a request to reload data from a system memory into the shared memory by the processing device.

8. The apparatus of claim 1, wherein the shared memory comprising a last level cache (LLC).

9. An apparatus, comprising:
a processor comprising:
a first processing core,
a second processing core,
a last level cache (LLC) coupled to the first processing core and the second processing core, and
memory monitor circuitry comprising memory monitor logic and monitor memory; and
a system memory coupled to the processor, the memory monitor logic arranged to:
identify a request to reload data into the LLC,
store the data in the monitor memory and flush the LLC responsive to the reload request, and
write the data from the monitor memory to the LLC.

10. The apparatus of claim 9, the memory monitor logic arranged to:
identify a request to evict data from the LLC by the first processing core;
identify a request to fill the LLC with data by the first processing core; and
identify an active memory attack by the first processing core responsive to identifying the request to evict data from the LLC and the request to fill the LLC with data by the first processing core.

11. The apparatus of claim 10, the memory monitor logic arranged to identify the request to reload data into the LLC by the second processing core responsive to identifying the active memory attack by the first processing core.

12. The apparatus of claim 11, the memory monitor logic arranged to identify the request to evict data from the LLC responsive to: a request to evict a portion of data stored in the LLC by the first processing core, a request to evict specific data from the LLC by the first processing core, a request to evict data from the LLC associated with the second processing core by the first processing core, or a memory flush command issued for the LLC by the first processing core.

13. The apparatus of claim 11, the memory monitor logic arranged to identify the request to fill the LLC with data by the first processing core responsive to a request to fill all or substantially of the LLC by the first processing core.

14. The apparatus of claim 11, the memory monitor logic arranged to evict data stored in the LLC associated with the first processing core to flush the LLC responsive to the reload request.

15. The apparatus of claim 9, the memory monitor logic arranged to identify a request to reload data from the system memory into the LLC by the second processing core.

16. The apparatus of claim 9, each of the first processing core and the second processing core comprising at least a level 1 cache.

17. A computer implemented method, comprising:
identifying an attempt, by a first core of a processor, to reload data into a last level cache (LLC) of the processor, the LLC shared with the first core and a second core of the processor;
storing the data in a monitor memory;
flushing the LLC; and
writing the data from the monitor memory to the LLC.

18. The method of claim 17, comprising:
identifying a request to evict data from the LLC by a second core;
identifying a request to fill the LLC with data by the second core; and
identifying an active memory attack by the second core responsive to identifying the request to evict data from the LLC and the request to fill the LLC with data by the second core.

19. The method of claim 18, comprising: identifying the request to reload data into the LLC by the first core responsive to identifying the active memory attack by the second core.

20. The method of claim 18, comprising identifying the request to evict data from the LLC responsive to: a request to evict a portion of data stored in the LLC by the second core, a request to evict specific data from the LLC by the second core, a request to evict data from the LLC associated with the first core by the second core, or a memory flush command issued for the LLC by the second core.

21. The method of claim 18, comprising identifying the request to fill the LLC with data by the second core responsive to a request to fill all or substantially of the LLC by the second core.

22. The method of claim 18, comprising evicting data stored in the LLC associated with the second core to flush the LLC responsive to the reload request.

* * * * *